United States Patent
Poirier

(10) Patent No.: US 6,764,751 B2
(45) Date of Patent: *Jul. 20, 2004

(54) COATED MULTILAYER POLYETHYLENE FILM

(75) Inventor: Robert V. Poirier, Fairport, NY (US)

(73) Assignee: ExxonMobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,760

(22) Filed: May 5, 1999

(65) Prior Publication Data

US 2002/0098334 A1 Jul. 25, 2002

Related U.S. Application Data

(63) Continuation-in-part of application No. 08/715,546, filed on Oct. 3, 1996.

(51) Int. Cl.[7] .............................................. B32B 27/32
(52) U.S. Cl. ....................... 428/215; 428/336; 428/516; 428/518; 428/520; 428/910
(58) Field of Search ......................... 428/304.4, 317.9, 428/323, 327, 411.1, 500, 515, 516, 518, 520, 910, 215, 336

(56) References Cited

U.S. PATENT DOCUMENTS

| 4,564,559 | A |   | 1/1986  | Wagner, Jr. et al. | 428/349  |
|-----------|---|---|---------|--------------------|----------|
| 4,565,739 | A |   | 1/1986  | Clauson et al.     | 428/349  |
| 4,626,397 | A |   | 12/1986 | Bose               | 264/565  |
| 4,797,235 | A |   | 1/1989  | Garland et al.     | 264/22   |
| 4,870,122 | A |   | 9/1989  | Lu                 | 524/488  |
| 4,891,173 | A |   | 1/1990  | Saitoh et al.      | 264/22   |
| 4,916,025 | A |   | 4/1990  | Lu                 | 428/516  |
| 5,006,378 | A |   | 4/1991  | Itaba et al.       | 428/34.9 |
| 5,106,545 | A |   | 4/1992  | Warren             | 264/22   |
| 5,223,346 | A |   | 6/1993  | Lu                 | 428/516  |
| 5,241,030 | A |   | 8/1993  | Barry et al.       | 526/348.1|
| 5,302,327 | A |   | 4/1994  | Chu et al.         | 264/22   |
| 5,302,442 | A |   | 4/1994  | O'Brien et al.     | 428/213  |
| 5,366,796 | A | * | 11/1994 | Murschall et al.   | 428/216  |
| 5,500,283 | A |   | 3/1996  | Kirk et al.        | 428/349  |
| 5,885,721 | A | * | 3/1999  | Su et al.          | 428/516  |
| 5,891,555 | A | * | 4/1999  | O'Brien            | 428/213  |

FOREIGN PATENT DOCUMENTS

GB          1287527          8/1972

OTHER PUBLICATIONS

Marilyn Bakker, Editor–in–Chief, and David Eckroth, Managing Editor, "The Wiley Encyclopedia Of Packaging Technology" (1986) John Wiley & Sons, 313–315, 514–529.

* cited by examiner

Primary Examiner—D. Lawrence
(74) Attorney, Agent, or Firm—Dennis P. Santini; Rick F. James

(57) ABSTRACT

Coated multilayer polyethylene films having improved sealability and barrier properties are provided. The films include a substrate which has been oriented in the machine direction to a degree of from about 5:1 to about 8:1 and in the direction transverse to the machine direction to a degree of from about 6:1 to about 15:1, and a coating selected from the group including polyvinylidene chloride, low temperature seal coating, polyvinyl alcohol polymer and acrylic coating. The substrate has a high density polyethylene base layer and at least a first skin layer adhered to a first side of the base layer.

13 Claims, No Drawings

COATED MULTILAYER POLYETHYLENE FILM

This application is a continuation-in-part application of U.S. Ser. No. 08/715,546, which was filed on Oct. 3, 1996 pending.

BACKGROUND OF THE INVENTION

The present invention relates to polymer films. Specifically, the present invention relates to coated multi-layer polyethylene films having improved sealability and barrier properties.

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching and windup. For a general description of these and other processes associated with film-making, see K. R. Osborn and W. A. Jenkins, *Plastic Films: Technology and Packaging Applications,* Technomic Publishing Co., Inc., Lancaster, Pa. (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength.

When a film has been stretched in a single direction (monoaxial orientation), the resulting film exhibits great strength and stiffness along the direction of stretch, but it is weak in the other direction, i.e., across the stretch, often splitting or tearing into fibers (fibrillating) when flexed or pulled. To overcome this limitation, two-way or biaxial orientation is employed to more evenly distribute the strength qualities of the film in two directions, in which the crystallites are sheetlike rather than fibrillar. These biaxially oriented films tend to be stiffer and stronger, and also exhibit much better resistance to flexing or folding forces, leading to their greater utility in packaging applications.

It is technically quite difficult to biaxially orient films by simultaneously stretching the film in two directions. Apparatus for this purpose is known, but tends to be expensive to employ. As a result, most biaxial orientation processes use apparatus that stretches the film sequentially, first in one direction and then in the other. Again for practical reasons, typical orienting apparatus stretches the film first in the direction of the film travel, i.e., in the longitudinal or "machine direction" (MD), and then in the direction perpendicular to the machine direction, i.e., the lateral or "transverse direction" (TD).

The degree to which a film can be oriented is dependent upon the polymer from which it is made. Polypropylene, polyethylene terephthalate (PET), and nylon are highly crystalline polymers that are readily heat stabilized to form dimensionally stable films. These films are well known to be capable of being biaxially stretched to many times the dimensions in which they are originally cast (e.g., 5× by 8× or more for polypropylene).

High density polyethylene (HDPE), however, exhibits even higher crystallinity (e.g., about 80–95%) relative to polypropylene (e.g., about 70%). As a result, HDPE films are generally more difficult to biaxially orient than polypropylene films. U.S. Pat. Nos. 4,870,122 and 4,916,025 describe imbalanced biaxially oriented HDPE-containing films that are MD oriented up to about two times, and TD oriented at least six times. This method produces a film that tears relatively easily in the transverse direction. Multi-layer films prepared according to this method are also disclosed in U.S. Pat. Nos. 5,302,442, 5,500,283 and 5,527,608, which are incorporated herein by reference.

U.S. Pat. No. 5,885,721, which is incorporated herein by reference, also discloses a multi-layer film having high biaxial orientation. In particular, this patent discloses a film including a HDPE substrate, at least one outer layer of a propylene copolymer, and at least one outer layer of an adhesion promoter material positioned between the outer layer and the HDPE substrate. The film is high biaxially oriented, being stretched in the machine direction to a degree of from about 5:1 to about 8:1, preferably from about 6:1 to about 7:1, and stretched in the transverse direction to a degree of from about 6:1 to about 15:1, preferably from about 9:1 to about 13:1.

The film-making process can also include coating a film to impart superior characteristics to the film and methods of coating are well known in the art. Most known methods provide for coating a film after it has been biaxially oriented.

Polyethylene films produced by processes known in the art have been widely used for structures such as grocery sacks or bread wrappers, but generally, they have been inadequate for packaging products such as snack foods and the like. Further, polyethylene films, in some applications, have lacked sufficient flavor and aroma barrier properties. Also, polyethylene films have lacked the ability to provide seal characteristics which are often required by food packagers.

Accordingly, it is one of the purposes of this invention, among others, to provide coated multilayer polyethylene films having improved sealability, oxygen barrier properties and flavor and aroma barrier properties, without requirement for chemical additives such as cross-linking agents, and without requirement for supplemental processing steps such as irradiation of the film.

SUMMARY OF THE INVENTION

It has now been discovered that these and other purposes can be achieved by the present invention, which provides for coated multilayer polyethylene films having improved sealability and barrier properties.

The present invention provides for a multilayer polyethylene film including a substrate and at least one coating selected from the group including polyvinylidene chloride (PVdC), low temperature seal coating (LTSC), polyvinyl alcohol polymer (PVOH) and acrylic coating. The substrate includes a high density polyethylene (HDPE) base layer and at least a first skin layer adhered to a first side of the base layer and substantially coextensive therewith. The substrate has been oriented in the machine direction to a degree of from about 5:1 to about 8:1 and in the transverse direction to a degree of from about 6:1 to about 15:1. The HDPE of the base layer preferably has a density of not less than about 0.940. (Density (d) is expressed as $g/cm^3$.)

In a preferred embodiment, the coating is at least 1 to 25 wt % of the multilayer film and the substrate is at least 75 wt % of the multilayer film. In another preferred embodiment, the coating is 10 to 15 wt % of the multilayer film and the substrate is 85 to 90 wt % of the multilayer film. In addition, the HDPE of the base layer has a density of at least about 0.958.

Another preferred embodiment of the present invention also provides for a multilayer polyethylene film including a substrate and at least one coating selected from the group including PVdC, LTSC, PVOH and acrylic coating. The substrate includes a HDPE base layer, at least a first skin layer adhered to a first side of the base layer and substantially coextensive therewith and a second skin layer adhered to a second side of the base layer and substantially coextensive therewith. The substrate has been oriented in the machine direction to a degree of from about 5:1 to about 8:1 and in the transverse direction to a degree of from about 6:1 to about 15:1.

Another preferred embodiment of the present invention also provides for a multilayer polyethylene film including a substrate and at least one coating selected from the group including PVdC, LTSC, PVOH and acrylic coating. The substrate has at least three layers including a HDPE base layer, a tie layer coextensive to the base layer and a first skin layer adhered to the tie layer and substantially coextensive therewith. The substrate has been oriented in the machine direction to a degree of from about 5:1 to about 8:1 and in the transverse direction to a degree of from about 6:1 to about 15:1.

Preferably, the substrate also includes a first tie layer interposed between the base layer and the first skin layer which is coextensive with each of the base layer and the first skin layer, and a second tie layer interposed between the base layer and the second skin layer which is coextensive with each of the base layer and the second skin layer.

Preferred embodiments of polyethylene films according to the present invention can include two or more coatings selected from the group including PVdC, LTSC, PVOH and acrylic coating. For example, a five-layer substrate as provided above can include on both the first skin layer and the second skin layer a coating selected from the group including PVdC, LTSC, PVOH and acrylic coating.

Preferred embodiments of polyethylene films according to the present invention provide for the addition of a cavitating agent to the substrate before the substrate is oriented. Preferably, the cavitating agent is selected from a group consisting of calcium carbonate ($CaCO_3$), titanium oxide ($TiO_2$) and polystyrene.

The present invention provides for multilayer polyethylene films with improved sealability, oxygen barrier properties and flavor/aroma barrier properties. The films also have excellent optics. These properties make these films an excellent alternative to films currently used in food packaging.

These and other advantages of the present invention will be appreciated from the detailed description and examples which are set forth herein. The detailed description and examples enhance the understanding of the invention, but are not intended to limit the scope of the invention.

DETAILED DESCRIPTION OF THE INVENTION

The present invention provides for coated multilayer HDPE films with improved sealability, water vapor transmission resistance and barrier properties. The multilayer polyethylene films include a substrate and a coating selected from the group including PVdC, LTSC, PVOH and acrylic coating. The substrate includes a base layer and at least a first skin layer adhered to a first side of the base layer and substantially coextensive therewith. The substrate has been oriented in the machine direction to a degree of from about 5:1 to about 8:1 and in the transverse direction to a degree of from about 6:1 to about 15:1. Preferably, the substrate has been oriented in the machine direction to a degree of from about 6:1 to about 7:1 and in the transverse direction to a degree of from about 9:1 to about 13:1.

The base layer of the substrate includes HDPE. The base layer has a thickness of from about 0.5 mil to about 2.0 mil, preferably from about 1.0 mil to about 1.40 mil. As the term "HDPE" is used herein, it is defined to mean an ethylene-containing polymer having a density of not less than about 0.940. (Density (d) is expressed as $g/cm^3$.) Films accordingly to the present invention include at least about 75 to 98% HDPE and preferably, about 85 to 90% HDPE.

One particularly suitable HDPE for use with the films of the present invention is the resin sold as M6211 (d=0.958) by Equistar. Another particularly suitable HDPE is the resin sold as HD 7845 (d=0.958) by Exxon. Other suitable HDPE resins include, for example, BDM 94-25 (d=0.961) and 6573 XHC (d=0.959) which are both available from Fina Oil and Chemical Co., Dallas, Tex. and Sclair 19C (d=0.951) and 19F (d=0.961) which are both available from Nova Corporation, Sarnia, Ontario, Canada.

The Melt Index (MI) of the HDPE useful according to the invention is in the range of from about 0.5 to about 10. (Melt Index is expressed as g/10 min.) Preferably, the HDPE has a melt index in the range of from about 0.5 to about 3.0. Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The first skin layer of the substrate preferably includes a propylene-ethylene copolymer wherein propylene is about 96.5% of the copolymer and ethylene is about 3.5% of the copolymer. The first skin layer including the propylene-ethylene copolymer has a thickness of from about 0.01 mil to about 0.15 mil, preferably about 0.05 mil.

The substrate of the multilayer polyethylene films of the present invention is biaxially oriented. Biaxial orientation is employed to evenly distribute the strength qualities of a film in the longitudinal or machine direction of the film and in the lateral or transverse direction of the film. Biaxial oriented films tend to be stiffer and stronger, and also exhibit much better resistance to flexing and folding forces, leading to greater utility in packaging applications.

Biaxial orientation can be conducted simultaneously in both directions, however, most biaxial orientation processes use apparatus which stretches the film sequentially, first in one direction and then in the other. A typical apparatus will stretch a film in the MD first and then in the TD. The degree to which a film can be stretched is dependent upon factors including, for example, the polymer from which a film is made. For further discussion concerning biaxial orientation of polyethylene films, see U.S. Pat. No. 5,885,721 which is discussed above, and U.S. application Ser. No. 08/715,546, which is incorporated herein by reference for all that it discloses.

During the process of biaxial orientation, a cast material is typically heated (optionally including a pre-heating stage) to its orientation temperature and subjected to MD orientation between two sets of rolls, the second set rotating at a greater speed than the first by an amount effective to obtain the desired draw ratio. Then, the monoaxially oriented sheet is oriented in the TD by heating (again optionally including pre-heating) the sheet as it is fed through an oven and subjected to transverse stretching in a tenter frame. Alternative stretching methods are possible, including employing apparatus capable of simultaneous stretching, or stretching sequentially first in the TD and then in the MD. It is known that these methods often suffer from serious technical limitations rendering them impracticable or overly expensive.

The biaxial orientation of the substrate, including any preheating step as well as the stretching steps, can be performed using stretch temperatures in the range of from about the glass transition temperature (Tg) of the substrate to above the crystalline melting point (Tm) of the substrate. More specifically, orientation in the MD is conducted at from about 200° F. to about 320° F., more preferably from about 230° F. to about 295° F. Orientation in the TD is conducted at from about 230° F. to about 320° F., more preferably from about 255° F. to about 300° F. The skilled artisan will understand that the orientation temperature employed in a particular situation will generally depend upon the residence time of the base sheet and the size of the rolls. Apparatus temperature higher than the Tm of the polyethylene sheet can be appropriate if the residence time is short. The skilled artisan also understands that the temperatures involved in these processes are in relation to the measured or set temperatures of the equipment rather than the temperature of the polyethylene itself, which generally cannot be directly measured.

The multilayer polyethylene films of the present invention also include at least one coating selected from the group including PVdC, LTSC, PVOH and acrylic coating. The amount of a coating provided in a multilayer film of the present invention should be at least 1 to 25 wt % of the multilayer film. Preferably, the amount of coating provided in a multilayer film is 7 to 15 wt % of the multilayer film.

The coating should be applied in such an amount that there will be deposited upon drying a smooth, evenly distributed layer, generally having a thickness of from about 0.01 to about 0.2 mil. The thickness of the applied coating should be such that it is sufficient to impart the desired seal, oxygen, water vapor and flavor and aroma barrier characteristics to the resulting film. After applying the coating to a substrate, it is subsequently dried by hot air, radiant heat or by any other convenient means.

PVdC coatings used with the present invention can be of any known and conventional PVdC composition, for example, the compositions described in U.S. Pat. Nos. 4,214,039 and 4,447,494, both of which are herein incorporated by reference.

A commercially available PVdC coating having a vinylidene chloride content of at least 50% can be used with the present invention and preferably, a PVdC coating having a vinylidene chloride content of from about 75% to about 92% are used with the present invention. Further, the PVdC coating used with the present invention can also be a copolymer of vinylidene chloride and one or more other ethylenically unsaturated comonomers including alpha, beta ethylenically unsaturated acids such as acrylic and methacrylic acids, and alkyl esters containing 1–18 carbon atoms of said acids such as methyl methacrylate, ethyl methacrylate, butyl methacrylate, etc. . . . Also, PVdC coatings used with the present invention can be an alpha, beta ethylenically unsaturated nitrites such as acrylonitrile and methacrylonitrile, and monovinyl aromatic compounds such as styrene and vinyl chloride comonomers.

When used in accordance with the present invention, PVdC coatings preferably include about 82% by weight of vinylidene chloride, about 14% by weight of ethyl acrylate and about 4% by weight of acrylic acid. Alternatively, a polymer coating including about 80% by weight of vinylidene chloride, about 17% by weight of methyl acrylate and about 3% by weight of methacrylic acid can be used with the present invention.

Preferably, a primer layer is applied to the film surface to which a PVdC coating is applied to enhance adhesion between the PVdC coating layer and the film surface.

The term "LTSC" as used herein is defined to mean a low temperature seal coating including ethyl acrylate. A particularly suitable LTSC which can be included in films of the present invention can be selected from the compositions disclosed in U.S. Pat. No. 5,119,960, the contents of which is incorporated herein by reference. LTSC compositions include an ethylene copolymer which includes about 65 to 95 weight % of ethylene and about 5 to 35 weight % of acrylic acid or methacrylic acid, wherein about 2 to 80% of the carboxyl groups are neutralized with metal ions from Group Ia, IIa or IIb of the Periodic Table, preferably sodium ions. It is preferable that a LTSC composition include about 75 to 85 weight % of ethylene and about 15 to 25 weight % of acrylic acid or methacrylic acid. Also, it is preferable that a LTSC composition contains microcrystalline wax and fumed silica.

PVOH coatings that can be included in films of the present invention can be selected from the compositions disclosed in U.S. Pat. No. 5,547,764, which is incorporated herein by reference. The PVOH solution includes a blend of at least two PVOH resins having different degrees of hydrolysis. The first component of the PVOH blend has a high degree of hydrolysis of at least about 98%, i.e., about 98% of the acetate groups of the poly (vinyl acetate) have been replaced with alcohol (OH) groups. The second component has a low degree of hydrolysis of at least about 80% to 90%. The PVOH blend of the two components includes a ratio of about 1:2 to about 20:1, preferably from about 2:1 to about 5.1, and most preferably from about 2.5:1 to 3.5:1. It is preferable that the PVOH coatings be an aqueous solution which includes a blend of at least two PVOH resins in an appropriate ratio to water at a temperature sufficient to dissolve the PVOH resin, a cross-linking agent and optionally a catalyst.

Acrylic coatings that can be included in the films of the present invention can be selected from any of the terpolymeric compositions disclosed in U.S. Pat. Nos. 3,753,769 and 4,865,908, the contents of which are incorporated herein by reference. These coating compositions contain as a film forming component a resin consisting essentially of an interpolymer of: (a) from about 2 to about 15 parts by weight, preferably from about 2.5 to about 6 parts by weight, of an alpha, beta monoethylenically unsaturated carboxylic acid selected from the group consisting of acrylic acid, methacrylic acid and mixtures thereof, and (b) from about 85 to 98 parts by weight, preferably from about 94 to about 97.5 parts by weight, of neutral monomer esters which preferably include methyl acrylate or ethyl acrylate, and methyl methacrylate. These interpolymer compositions are further characterized by preferably including from about 30% to about 55% by weight of methyl methacrylate when the alkyl acrylate is methyl acrylate and from about 52.5% to about 69% by weight of methyl methacrylate when the alkyl acrylate is ethyl acrylate. Such coating compositions can be applied to the films of this invention in a variety of ways including in the form of ammoniac solutions.

Before applying a coating to a substrate, the upper surface of the substrate is preferably treated to increase its surface energy and therefore insure that the coating layer will be strongly adherent to the substrate and thereby reducing the possibility of the coating peeling or being stripped away from the film. This treatment can be accomplished employing any of several known and conventional techniques.

Further, in applications where even greater adherence between the coating and substrate is desired, i.e., greater than that resulting from treatment of the substrate, an intermediate primer coating can be employed to increase the adherence of the coating to the substrate. In this case, the substrate is advantageously first treated to provide increased active adhesive sites thereon (thereby promoting primer adhesion) and subsequently a coating of a primer material is applied to the treated substrate. Such primer materials are well known in the art and include, for example, epoxy and polyethylene imine (PEI) materials. U.S. Pat. Nos. 3,753, 769, 4,858,645 and 4,439,493, which are herein incorporated by reference, disclose the use and application of such primers. The primers provide an overall adhesively active surface for thorough and secure bonding with the subsequently applied coating and primers can be applied to a substrate by conventional solution coating means, for example, by mating roller application.

The coating can be applied to a substrate as a solution, e.g., one prepared with an organic solvent such as an alcohol, ketone, ester, etc. However, since the coating can contain insoluble, finely divided inorganic materials which are difficult to keep well dispersed in organic solvents, it is preferable that the coating be applied to the treated surface in any convenient and known manner, such as by gravure coating, roll coating, dipping, spraying, etc. The excess aqueous solution can be removed by squeeze rollers, doctor blades, etc.

The total thickness of polymer films of the present invention is not critical and will be selected to meet the particular service requirements. For example, when used in packaging, the total thickness of a coated multilayer polyethylene film can be from about 0.3 mil to about 3.0 mil wherein the substrate is about 90 to 98% of the weight of the film and the coating is about 2 to 10% of the weight of the film.

The multilayer polyethylene films of the present invention can include two or more coatings selected from the group including PVdC, LTSC, PVOH and acrylic coating. For example, a film can include a substrate interposed between a PVdC coating on one side of the substrate and a acrylic coating on the other side. While this is one embodiment of the present invention, several other embodiments having multiple layers with varying compositions and thicknesses can be provided having improved sealability, printability and barrier properties in accordance with the present invention.

One preferred embodiment of the present invention provides for a multilayer polyethylene film including a substrate and at least one coating selected from the group including PVdC, LTSC, PVOH and acrylic coating. The substrate includes a HDPE base layer and a first skin layer adhered to the base layer and substantially coextensive therewith. The substrate has been oriented in the machine direction to a degree of from about 5:1 to about 8:1 and in the transverse direction to a degree of from about 6:1 to about 15:1. The coating is 10 to 15 wt % of the multilayer film and the substrate is 85 to 90 wt % of the multilayer film. In addition, the HDPE of the base layer has a density of at least about 0.958.

Another preferred embodiment of the present invention also provides for a multilayer polyethylene film including a substrate and at least one coating selected from the group including PVdC, LTSC, PVOH and acrylic coating. The substrate has at least three layers including a HDPE base layer, a tie layer coextensive to the base layer and a first skin layer adhered to the tie layer and substantially coextensive therewith. The substrate has been oriented in the machine direction to a degree of from about 5:1 to about 8:1 and in the transverse direction to a degree of from about 6:1 to about 15:1. The amount of a coating provided should be at least 1 to 25 wt % of multilayer film. Preferably, the amount of a coating provided is 10 to 15 wt % of the multilayer film.

Tie layers as provided in embodiments of the present invention include a polyethylene having a density no greater than the density of the HDPE base layer. For example, a tie layer can include a polyethylene including about 70 to 90% HDPE and about 10 to 30% LDPE. It is preferable that a tie layer include about 80% HDPE and about 20% LDPE. Alternatively, a tie layer can include a medium density polyethylene (MDPE).

Another preferred embodiment of the present invention also provides for a multilayer polyethylene film including a substrate and at least one coating selected from the group including PVdC, LTSC, PVOH and acrylic coating. The substrate includes a HDPE base layer, at least a first skin layer adhered to a first side of the base layer and substantially coextensive therewith and a second skin layer adhered to a second side of the base layer and substantially coextensive therewith. The substrate has been oriented in the machine direction to a degree of from about 5:1 to about 8:1 and in the transverse direction to a degree of from about 6:1 to about 15:1. The amount of a coating provided should be at least 1 to 25 wt % of multilayer film. Preferably, the amount of a coating provided is 10 to 15 wt % of the multilayer film.

In a similar preferred embodiment, the substrate of the aforementioned embodiment is provided and it further includes a first tie layer interposed between the base layer and the first skin layer which is coextensive with each of the base layer and the first skin layer, and a second tie layer interposed between the base layer and the second skin layer which is coextensive with each of the base layer and the second skin layer. This embodiment having a five-layer substrate can also include on both the first skin layer and the second skin layer a coating selected from the group including PVdC, LTSC, PVOH and acrylic coating.

While the foregoing embodiments have been illustrated, it should be noted that several other embodiments having multiple layers with varying compositions and thicknesses can be prepared according to the present invention having improved sealability and barrier properties.

Cavitating agents can be included in the films of the present invention to generate an opaque appearance and voids (cavities) in the structure of the film. In particular, cavitating agents can be added into the substrate, in particular, the HDPE base layer, before the substrate is oriented in the MD. It is believed that small inhomogeneities introduced into the HDPE base layer by the cavitating agent result in points of weakness in the base layer. The biaxial orienting process then induces small tears in the base layer, causing cavitation in the resulting base layer. Suitable cavitating agents include, for example, calcium carbonate ($CaCO_3$), titanium oxide ($TiO_2$) and polystyrene. Organic cavitating agents are generally less preferred due to their limited operating temperature range. However, such organic cavitants can be useful if they are extremely finely divided and are either resistant to melt at operating temperatures or produce a suitable inhomogeneity in the polyethylene material. Cavitating agents such as $CaCO_3$, $TiO_2$ and polystyrene can be included in the HDPE base layer in an amount of from about 5 wt % to about 25 wt % of the HDPE base layer. Further, cavitating agents can be included using methods known in the art, such as that described in U.S. application Ser. No. 07/993,983, incorporated herein by reference.

The films of the present invention can be surface treated with conventional methods to improve wettability of the film and ink receptivity. The films can also be modified by metallization to obtain a metal-like appearance and altered barrier characteristics.

The films of the present invention are useful in numerous applications including food packaging and in particular, in food packaging where sealability is desirable. The films of the present invention also have improved barrier properties which makes them advantageous for use in cigarette pack inner liners, as over wrap for butter, chocolate, candy, etc., and as twistwrap.

The following examples are provided to assist in further understanding the invention. The particular materials and conditions employed are intended to be further illustrative of the invention and are not limiting upon the reasonable scope thereof.

EXAMPLE 1

TABLE 1 shows the structure of an uncoated clear multilayer polyethylene film. TABLE 2 shows the sealability and barrier properties of film structures resulting from applying various coatings to the multilayer film of TABLE 1.

TABLE 1

| Layers (from top to bottom) | Composition of Layer | Layer Thickness |
| --- | --- | --- |
| Skin | 96.5% Propylene + 3.5% Ethylene | 0.05 |
| Tie | 80% HDPE + 20% LDPE | 0.05 |
| Base | HDPE | 0.70 |
| Tie | 80% HDPE + 20% LDPE | 0.05 |
| Skin | 96.5% Propylene + 3.5% Ethylene | 0.05 |

It should be noted that the top side of this film structure is the air knife side and the bottom side of the film structure is the caster side. The thickness of each layer is expressed above in mils.

TABLE 2

| Sample | Coating | WVTR g/100 $in^2$/d | TO2 cc/100 $in^2$/d | Crimp Seal Strength g/in | Flavor/Aroma Barrier |
| --- | --- | --- | --- | --- | --- |
| 1 | none | 0.25 | 107–125 | 0 | poor |
| 2 | acrylic | 0.24 | 69 | 140 | good |
| 3 | PVdC(8300) | 0.20 | 20 | 170 | good |
| 4 | PVdC(8500) | 0.12–0.15 | 1.0 | N/M | good |
| 5 | PVdC(8300) + acrylic | 0.21–0.23 | 4.3–9.2 | 165 | good |
| 6 | PVdC(8500) + acrylic | 0.19 | 0.79 | N/M | good |
| 7 | LTSC | N/M | N/M | 330 | good |

N/M - not measured

Sample 1 shows the properties of an uncoated clear multilayer polyethylene film. Samples 2–7 show coated multilayer polyethylene films according to the present invention. The water vapor transmission rate (WVTR) of Samples 1–7 is given in g/100 $in^2$/day and was measured at 100° F. and 90% Rh (ASTM F 1249–89). The rate of oxygen transmission (TO2) is given in cc/100 $in^2$/day and was measured at 23° C. and 0% Rh (ASTM D 3985-81). The crimp seal strength of Samples 1–7 is given in g/in and was measured at 20 psi, 0.75 sec at 240° F.

The coated films of Samples 2–7 showed improved sealability and barrier properties in comparison to the uncoated film of Sample 1. In particular, the coated films of Samples 3–6 show improved resistance to water vapor transmission and oxygen transmission in comparison to the uncoated film of Sample 1. Further, the coated films shown in TABLE 2 also show improved crimp seal strength in comparison to the uncoated film of Sample 1. The coated films of Samples 2–7 also show improved flavor and aroma barrier properties in comparison to the uncoated film of Sample 1.

Samples 3–6 included either 8300 PVdC or 8500 PVdC as a coating and the two different PVdC coatings were used to show that a coated multilayer polyethylene film of the present invention can be even further improved by using a higher crystalline material coating. In particular, 8500 PVdC is a higher crystalline material and as shown, it provides better barrier than a 8300 PVdC.

With respect to Sample 7, the water vapor transmission rate and rate of oxygen transmission were not measured as the LTSC was not expected to impact either.

EXAMPLE 2

TABLE 3 shows the structure of an uncoated opaque polyethylene film. TABLE 4 shows the sealability and barrier properties of film structures resulting from applying various coatings to the multilayer film of TABLE 3.

TABLE 3

| Layers (from top to bottom) | Composition of Layer | Layer Thickness |
| --- | --- | --- |
| Skin | MDPE | 0.05 |
| Tie | HDPE | 0.05 |
| Base | 94% HDPE + 6% $CaCO_3$ | 0.70 |
| Tie | HDPE | 0.05 |
| Skin | MDPE | 0.05 |

It should be noted that the top side of this film structure is the air knife side and the bottom side of the film structure is the caster side. The thickness of each layer is expressed above in mils.

TABLE 4

| Sample | Coating | WVTR g/100 in²/d | TO2 cc/100 in²/d | Crimp Seal Strength g/in |
|---|---|---|---|---|
| 8 | none | 2.42 | >500 | 0 |
| 9 | acrylic | N/M | N/M | 500 |
| 10 | LTSC | N/M | N/M | 400 |
| 11 | PVdC (2.7 g) | 0.35 | 0.15 | 900 |
| 12 | PVdC (1.8 g) | 0.70 | 1.15 | 600 |

N/M not measured

Sample 8 shows the properties of an uncoated opaque multilayer polyethylene film. Samples 9–12 show coated multilayer polyethylene films according to the present invention. The water vapor transmission rate (WVTR) of Samples 8–12 is given in g/100 in²/day and was measured at 100° F. and 90% Rh (ASTM F 1249–89). The oxygen transmission rate (T02) is given in cc/100 in²/day and measured at 23 ° C. and 0% Rh (ASTM D 3985-81). The crimp seal strength of Samples 8–12 is given in g/in and was measured at 20 psi, 0.75 sec. at 260° F.

The coated films of Samples 8–12 show improved sealability in comparison to the uncoated film in Sample 8. Further, Samples 11 and 12 also show improved resistance to water vapor transmission and oxygen transmission in comparison to the uncoated film of Sample 8. Also, in Samples 11 and 12, increasing the coating weight from 1.8 to 2.7 g/msi showed increased improvement in seal strength and barrier.

With respect to Samples 9 and 10, the water vapor transmission rate and rate of oxygen transmission were not measured as the LTSC was not expected to impact either.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

What is claimed is:

1. A multilayer polyethylene film comprising:
  a substrate comprising
    a base layer having a first side and a second side, the base layer comprising high density polyethylene (HDPE),
    a first tie layer comprising an ethylene polymer selected from the group consisting of HDPE, medium density polyethylene (MDPE), low density polyethylene (LDPE), and blends thereof,
    and a first skin layer comprising propylene-ethylene copolymer or MDPE; and
  at least one coating applied to the first skin layer, the coating having a thickness of from about 0.2 μm to about 5.1 μm, and the coating being selected from the group consisting of polyvinylidene chloride (PVdC), low temperature seal coating (LTSC), polyvinyl alcohol polymer (PVOH) and acrylic coating,
  wherein the first tie layer is interposed between the base layer and the first skin layer, the first tie layer is coextensive with both the first side of the base layer and the first skin layer, and the substrate is oriented in the machine direction to a degree of from about 5:1 to about 8:1 and in the transverse direction to a degree of from about 6:1 to about 15:1.

2. The multilayer film of claim 1, wherein the coating comprises from 1 to 25 wt % of the multilayer film.

3. The multilayer film of claim 2, wherein the coating comprises from 10 to 15 wt % of the multilayer film.

4. The multilayer film of claim 1, wherein the HDPE of the base layer has a density of at least about 0.958 g/cm³.

5. The multilayer film of claim 1, wherein the film further comprises a second skin layer adhered to the second side of the base layer and coextensive therewith.

6. The multilayer film of claim 5, wherein a second tie layer is interposed between the base layer and the second skin layer, the second tie layer is coextensive with both the second side of the base layer and the second skin layer, and the second tie layer comprises an ethylene polymer selected from the group consisting of HDPE, medium density polyethylene (MDPE), low density polyethylene (LDPE), and blends thereof.

7. The multilayer film of claim 6, wherein the first skin layer and the second skin layer are each coated with a coating selected from the group consisting of PVdC, LTSC, PVOH and acrylic coating.

8. The multilayer film of claim 1, wherein a cavitating agent is added into the base layer before the substrate is oriented.

9. The multilayer film of claim 8, wherein the cavitating agent is selected from the group consisting of calcium carbonate (CaCO₃), titanium oxide (TiO₂) and polystyrene.

10. The multilayer film of claim 8, wherein the cavitating agent is added to the base layer in an amount of from about 5 to about 25 wt %, based on the weight of the base layer.

11. The multilayer film of claim 1, wherein the coating is selected from the group consisting of PVdC, LTSC, and acrylic coating.

12. The multilayer film of claim 1, wherein the base layer is from about 12.7 μm to about 50.8 μm, the first skin layer is from about 0.2 μm to about 3.8 μm, the coating is from about 0.2 μm to about 5.1 μm, and the total thickness is less than about 76.2 μm.

13. The multilayer film of claim 1, wherein the first tie layer comprises from about 70 to about 90% HDPE and from about 10 to about 30% LDPE.

* * * * *